United States Patent
Colburn et al.

(10) Patent No.: US 7,425,891 B2
(45) Date of Patent: Sep. 16, 2008

(54) TACTICAL TRUCK SYSTEM DASHBOARD

(75) Inventors: Jeffrey B. Colburn, Harpursville, NY (US); Gary Crowley, Binghamton, NY (US); Charles T. DiSaverio, Apalachin, NY (US); Shane F. Mills, Owego, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 226 days.

(21) Appl. No.: 11/430,462

(22) Filed: May 9, 2006

(65) Prior Publication Data

US 2007/0262854 A1 Nov. 15, 2007

(51) Int. Cl.
*B60Q 1/00* (2006.01)

(52) U.S. Cl. .............................. 340/438; 340/945; 701/1

(58) Field of Classification Search ................. 340/438, 340/945, 995.26, 69.6; 296/37.12, 70; 701/1
See application file for complete search history.

(56) References Cited

U.S. PATENT DOCUMENTS

| D82,501 | S | 11/1930 | Henderson | |
|---|---|---|---|---|
| D100,173 | S | 6/1936 | Mayer | |
| D156,455 | S | 12/1949 | Patten | D66/1 |
| D209,957 | S | 1/1968 | Lathers | D14/6 |
| 5,174,621 | A | 12/1992 | Anderson | 296/70 |
| D339,786 | S | 9/1993 | Allendorph et al. | D12/192 |
| 5,259,655 | A | 11/1993 | Anderson | 296/70 |
| D378,585 | S | 3/1997 | Duguid et al. | D12/192 |
| 5,743,585 | A | 4/1998 | Pranger et al. | 296/37.12 |
| D395,030 | S | 6/1998 | Hellhake et al. | D12/192 |
| D397,977 | S | 9/1998 | Hellhake et al. | D12/192 |
| 5,890,756 | A | 4/1999 | Pranger et al. | 296/37.12 |
| 5,903,227 | A | * 5/1999 | Scheuer | 340/945 |
| D413,095 | S | 8/1999 | Abalos et al. | D12/192 |
| D423,434 | S | 4/2000 | Yano et al. | D12/192 |
| 6,112,141 | A | * 8/2000 | Briffe et al. | 701/14 |
| D439,556 | S | 3/2001 | Beigel | D12/192 |
| D440,924 | S | 4/2001 | Bartholomäi | D12/192 |
| 6,381,519 | B1 | * 4/2002 | Snyder | 701/3 |
| 6,421,593 | B1 | * 7/2002 | Kempen et al. | 701/48 |

(Continued)

FOREIGN PATENT DOCUMENTS

DE 3902678 A1 8/1990

(Continued)

*Primary Examiner*—Phung Nguyen
(74) *Attorney, Agent, or Firm*—Burns & Levinson, LLP; Jacob N. Erlich, Esq.; David W. Gomes, Esq.

(57) ABSTRACT

A tactical vehicle has a driver position and a command position, and possibly other positions such as a gunner position. The dashboard provides a plurality of displays and warning lights viewable from the driver position to provide information for the driver of a vehicle and arranged to be monitored from the command position. There are also a plurality of displays and communications devices viewable from the command position to provide information for the commander sitting in the passenger seat of such vehicle. There is a vehicle management display, climate control panel and vehicle intercom devices accessible for use from the driver position and also from the command position. At least one of the displays is constructed and arranged to be video matrixed so that the information is viewable from both the driver position and the command position, and also from a gunner position if one is provided.

11 Claims, 11 Drawing Sheets

U.S. PATENT DOCUMENTS

| | | | |
|---|---|---|---|
| D480,029 S | 9/2003 | Kraus | D12/192 |
| 6,668,215 B2 * | 12/2003 | Lafon et al. | 701/3 |
| D489,301 S | 5/2004 | Okonkwo | D12/192 |
| D494,518 S | 8/2004 | Kraus et al. | D12/192 |
| 7,307,549 B2 * | 12/2007 | Firra | 340/974 |
| 2005/0280524 A1 * | 12/2005 | Boone et al. | 340/461 |

FOREIGN PATENT DOCUMENTS

| | | |
|---|---|---|
| EP | 0083701 A2 | 7/1983 |
| EP | 0433524 A1 | 6/1991 |
| EP | 0607585 A1 | 7/1994 |

* cited by examiner

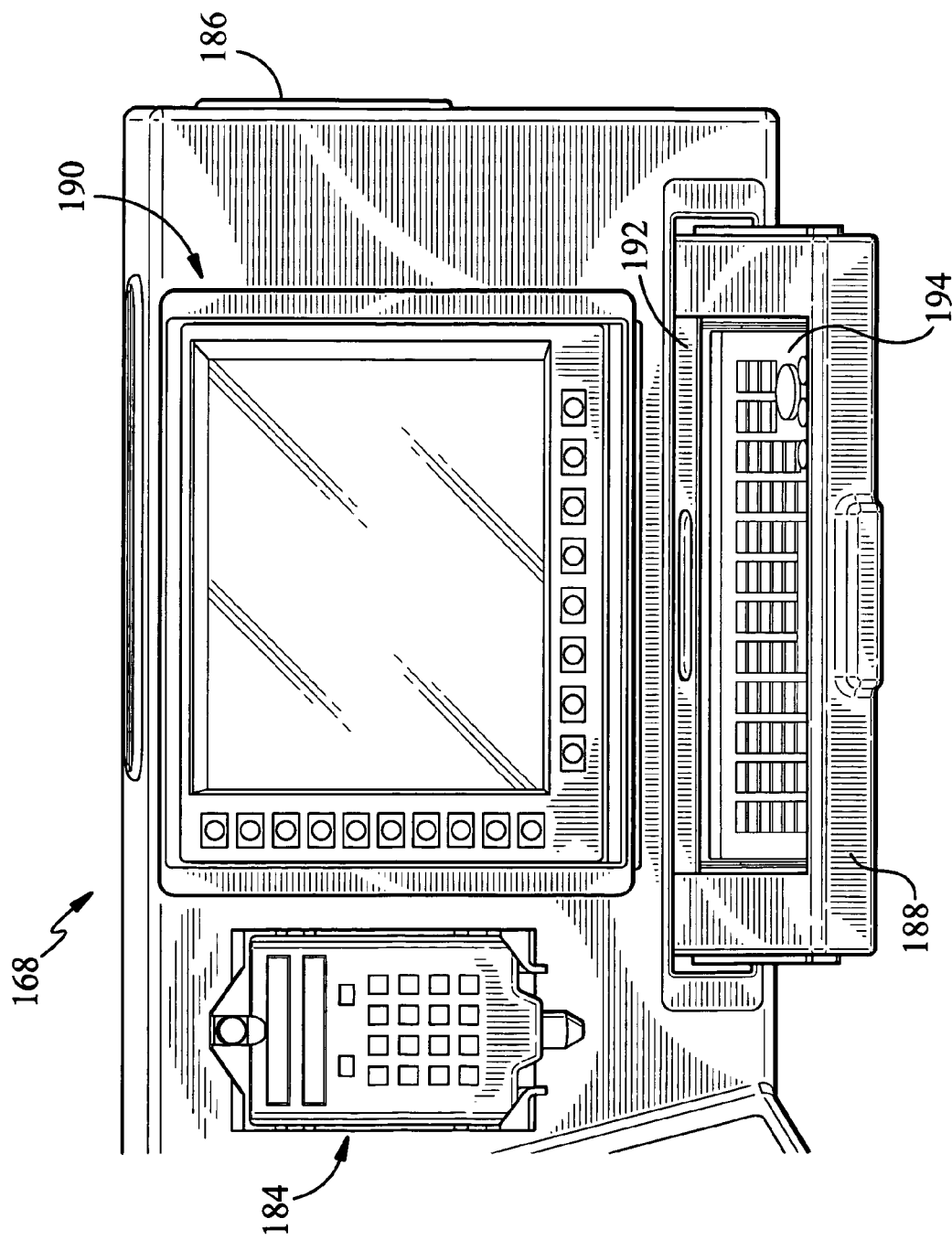

TACTICAL TRUCK SYSTEM DASHBOARD

FIELD OF THE INVENTION

This invention relates generally to the vehicle art, and, more particularly to tactical truck system dashboards.

SUMMARY OF THE PRESENT INVENTION

There is a desire for a basic tactical truck systems utility vehicle which is a 4×4 wheeled vehicle which incorporates features needed to support the requirements of a combat system. There are several types of such vehicles that are desired, one of which is a command and control vehicle. Such vehicles will be operating on primary and secondary roads, trails and off road ground conditions. They are to be capable of fording water and operating in temperature from basic cold to basic hot conditions. With appropriate adjustment they are to be capable of operating in extreme cold conditions and to be capable of traveling through deep water, such as streams. Also, the vehicle may have a companion trailer which it tows and which performs differing functions depending upon the type of activity being conducted.

In the command and control type vehicle, there needs to be a provision for a driver and a command person and thus a dashboard that provides information to each of them to allow them to perform their designated functions. The present invention provides a dashboard having three primary sections. The first section is on the driver's side and provides the usual types of displays and controls typically found in commercial and military vehicles. An example of these functions are speed and rpm as well as fuel levels and the conditions of the hydraulic system and the tires. The next section, which is the third section, is on the side of the vehicle next to the command position and the middle or second section is between the first and third sections. The middle section is visible to and usable by both the driver, commander and the gunner if the vehicle is equipped for a gunner.

The dials, gauges and other displays as well as the controls, which can be push buttons or sliders or gear shifts, depending upon the functions desired, are provided in the three sections of the dashboard. These sections can be configured depending on the mission profile and those control options that are required by function, which can be driven by the requirements of that particular truck variant. The present invention provides a vehicle dashboard system that has incorporated standard and new advance vehicle operational controls as well as looking at crew logical workload sharing and related ergonomics. It provides a vehicle dashboard system that can be configured to incorporate different controls that are required depending on different utility variant configuration.

The present invention together with the above and other advantages may best be understood from the following detailed description of the embodiments of the invention illustrated in the drawings, wherein:

BRIEF DESCRIPTION OF THE DRAWINGS

FIG. 11 is a diagrammatic view of the commander's front instrument panel including a retractable map table/keyboard tray.

DETAILED DESCRIPTION OF PREFERRED EMBODIMENTS

Figure 1:
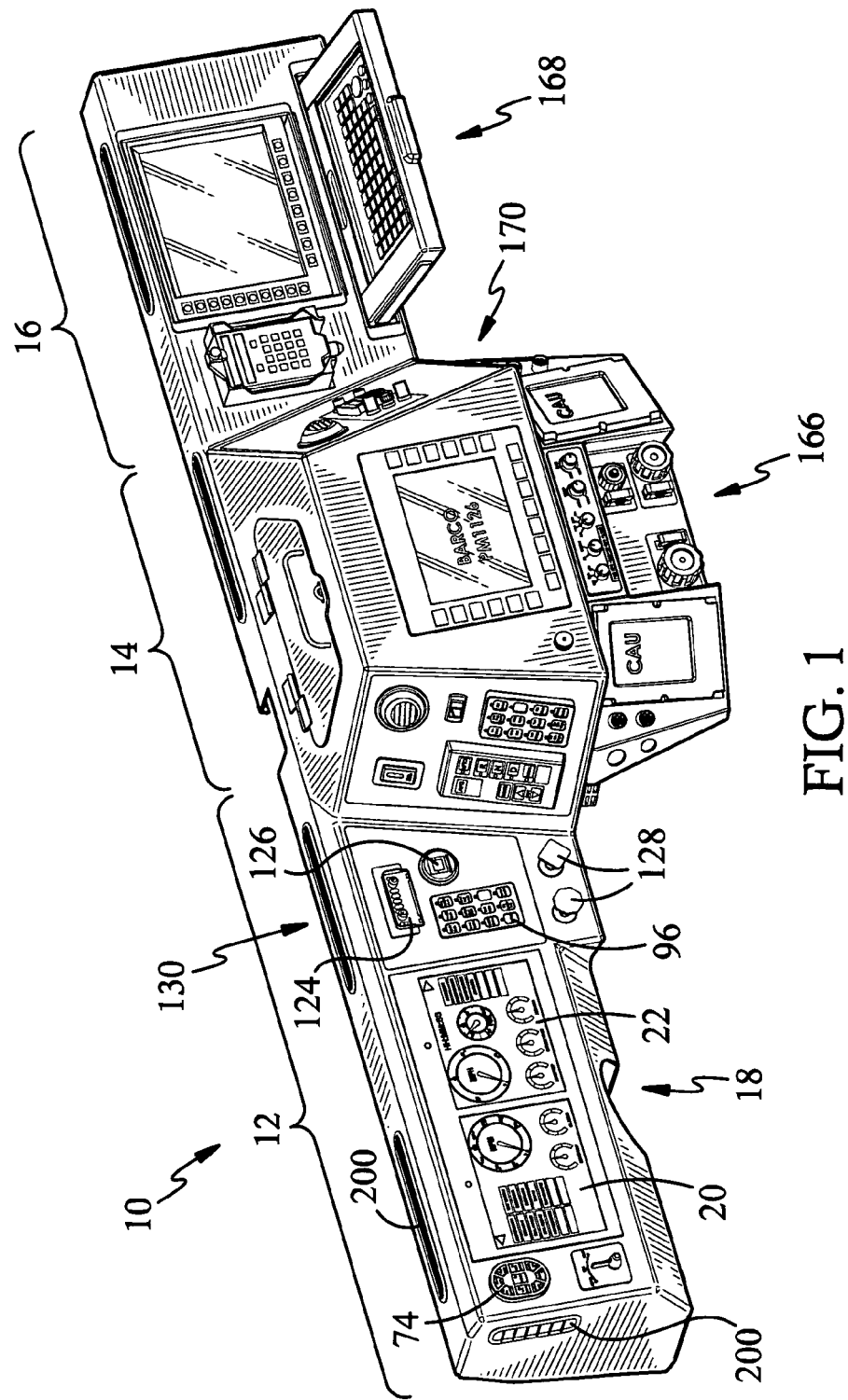
FIG. 1 is an isometric diagrammatic view of the dashboard as viewed from the driver's side (left).
Figure 2:
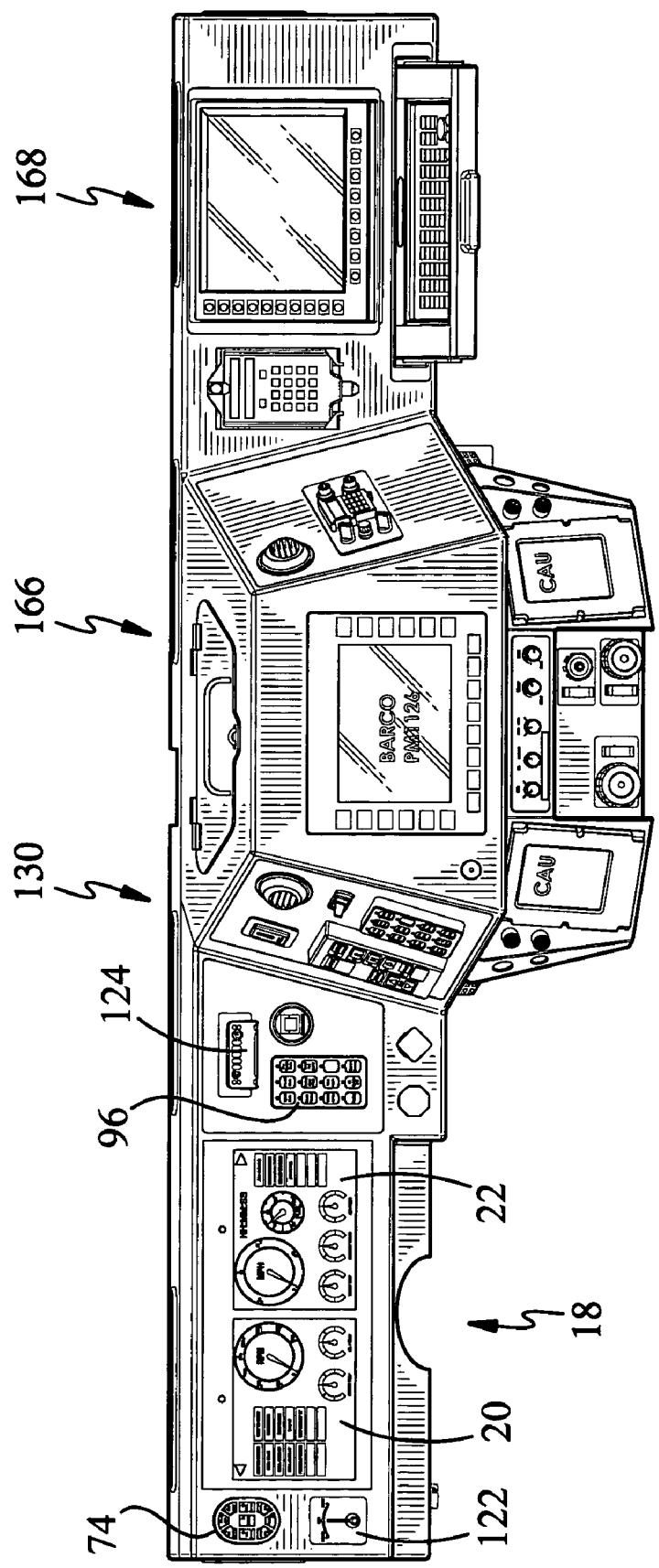
FIG. 2 is an isometric view similar to FIG. 1, but taken from a position in the middle of the front seat of the vehicle.
Figure 3:
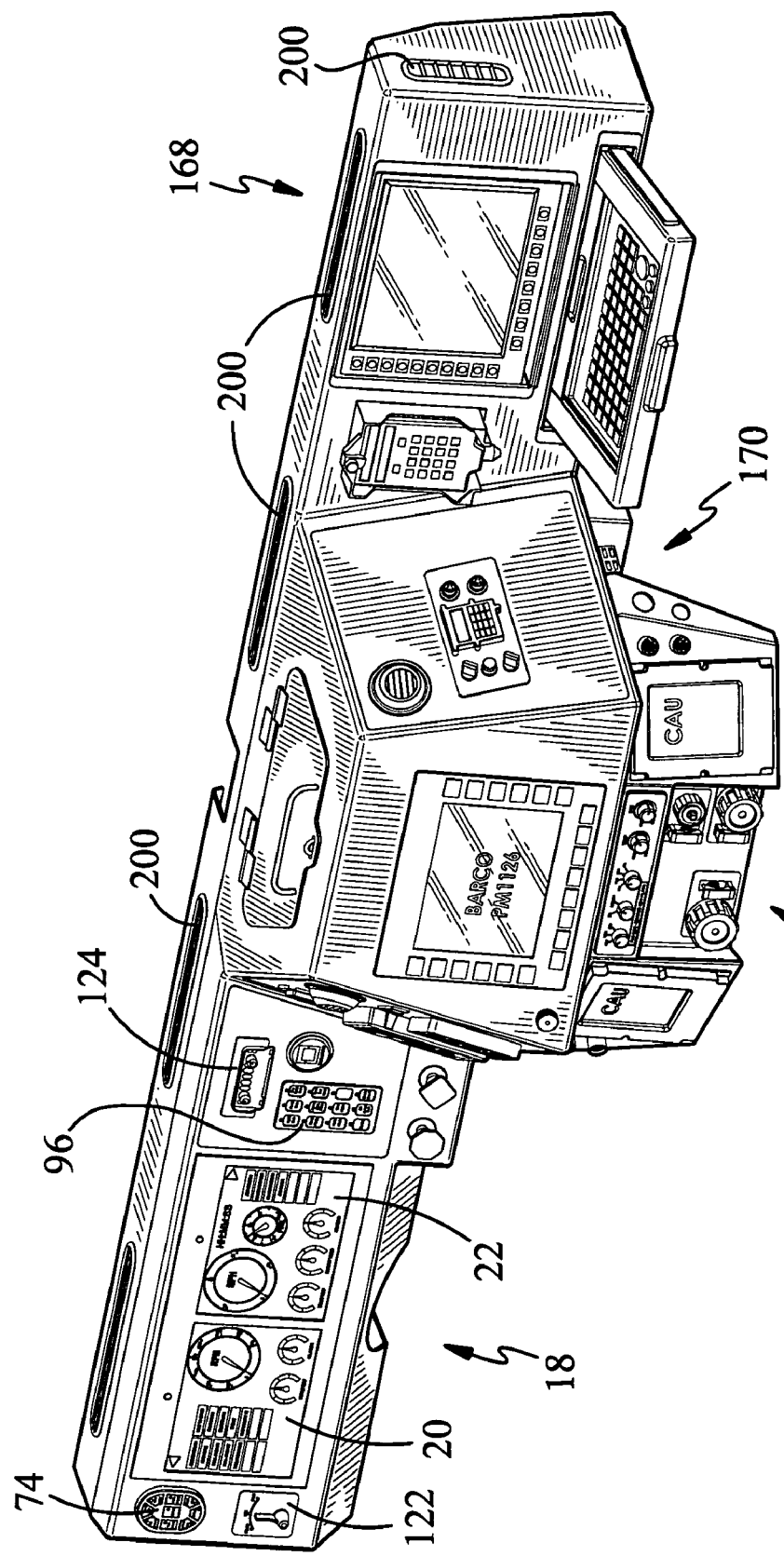
FIG. 3 is an isometric view similar to FIGS. 1 and 2, but taken from the command position.
Figure 4:
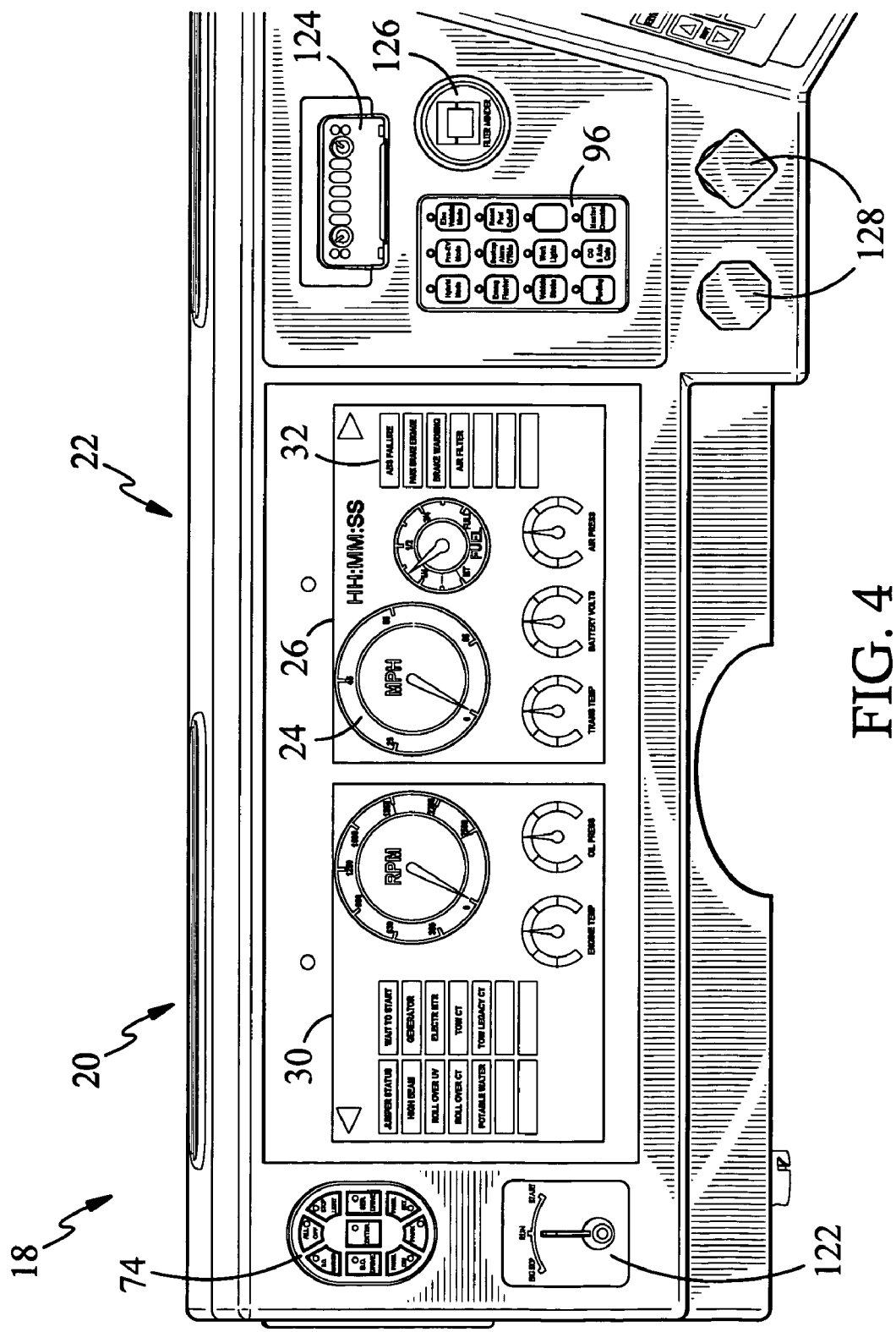
FIG. 4 is a diagrammatic view of the driver's front view panel.

The present invention provides a dashboard for a tactical truck systems utility vehicle. The dashboard is configurable depending upon the functions desired for the vehicle. There are various types of vehicles, such as trucks for moving equipment or personnel, trucks with a gun mount for a gunner, ambulances or other medical type of vehicles, and the like. The dashboard arrangement can be configured to fit properly with the overall vehicle configuration and the mission profile. FIGS. 1, 2 and 3 show such a dashboard 10 which includes a driver section 12, a middle section 14, and a command section 16.

The controls are designed and logically grouped based on functional relationship and ergonomics. For example, the vehicle mobility functions are co-located on one keypad, and utility functions are grouped into another switch console, and the like. This grouping of functions maximizes head up operations. This enables the crew to effectively accomplish all required control tasks, maximize head-up operation, and optimize sequential operation which reduces the operator overall workloads.

Controls are back lit where appropriate and provide touch sensory feedback when actuated. The controls associated with the display are either mounted on the display bezel or are mounted under the display like the keyboard and joystick. Controls are designed and logically grouped based on functional relationship with consideration to operator ergonomics. This grouping of functions maximizes head up operations as well as providing for the sharing of workloads between crew members.

There is a driver instrumentation cluster (DIC) which includes gauges that display fuel level, engine coolant temperature, engine oil pressure, engine tachometer, speedometer/odometer, air pressure for primary and secondary tank, air filter gauge, brake warning (indicating light), park brake status (indicating light) and battery percent of charge.

The DIC warning lights include engine temperature, headlight high beam, emergency brake status, ABS error, -left and right turn signal, wait to start, stop engine, check engine and transmission, air filter, brake warning, roll over warning for the UV and CT, Tow CT and others.

The DIC not only lights the correct warning lights, but has a built in audible alarm for low oil pressure, high coolant temp, park brake set, low fuel, low battery charge, low air pressure (primary and secondary) tanks, and others. The vehicle uses the Master Vehicle Light Switch (MVLS) for lighting controls. The emergency flasher switch is located on the utility keypad assembly, which is located to the right of the driver.

The gauges in the DIC are color coded to indicate safe, cautious and/or dangerous ranges. The gauges are oriented in such a way so that when the needles are pointing straight up, all indications are in the green or desirable operation range. This enables he driver a simple quick glance to verify that vehicle is operating in the desirable range.

The displays are mounted to be minimally intrusive into the crew space and the controls permit adjustment of contrast and brightness and the display supports blackout mode. The displays are touch screen as well as keyboard driven and the keyboards fold or slide out of the way when not needed. The displays are night-vision compatible.

In one embodiment, the display controls are located on the display bezel and the hand does not obscure the display when the bezel key is pressed. The keyboard and joystick are located below the display thereby providing an open view of the screen when these controls are in use.

Dashboard controls are located in clusters around the appropriate crew station. As an example, the driver has controls to shift the vehicle, control the vehicle height (CTIS) and other driver aids. The commander station has access to IT applications, radio control, DVE video display, and it can also act as a control station for the optional remote control weapons system.

Emergency messages are displayed in the message area of the driver cluster or on the vehicle management display located on the console to the right of the driver. The commander can monitor the vehicle management application from the commander's work station.

All controls are directly in front of the user of the display with the exception of the vehicle management display that is mounted to the right of the driver's position on the central console. The driver can get an acceptable viewing angle with minimal parallax error by sitting fully back in the seat.

From a pushbutton on the driver's utility keypad, a request is sent out via a databus to the suspension controller. The suspension controller performs the calculation and provides the center of gravity (CG) and axle-load information via the databus to the DIC for display on the LCD display in a text format and recorded in the vehicle management system (VMS) software. Optionally, the vehicle management software can be enhanced to provide this information in a graphical format if it is useful for the operator.

A receptacle is placed on the dashboard to allow the connection of the winch handheld control device. Once the winch handheld device is connected, the operator is allowed to extend and or retract the winch cable regardless of which end of the vehicle the winch is installed.

Another example of the DIC is a display showing the percent of charge remaining in the Hybrid batteries. This information is monitored via the Hybrid Control Module and is communicated via a network to the DIC. In addition to a gauge on the DIC the percent of charge is displayed on the LCD that is located in front of the driver. All of the vehicle's J1939 data bus traffic is monitored via the VMS software.

Figure 5:
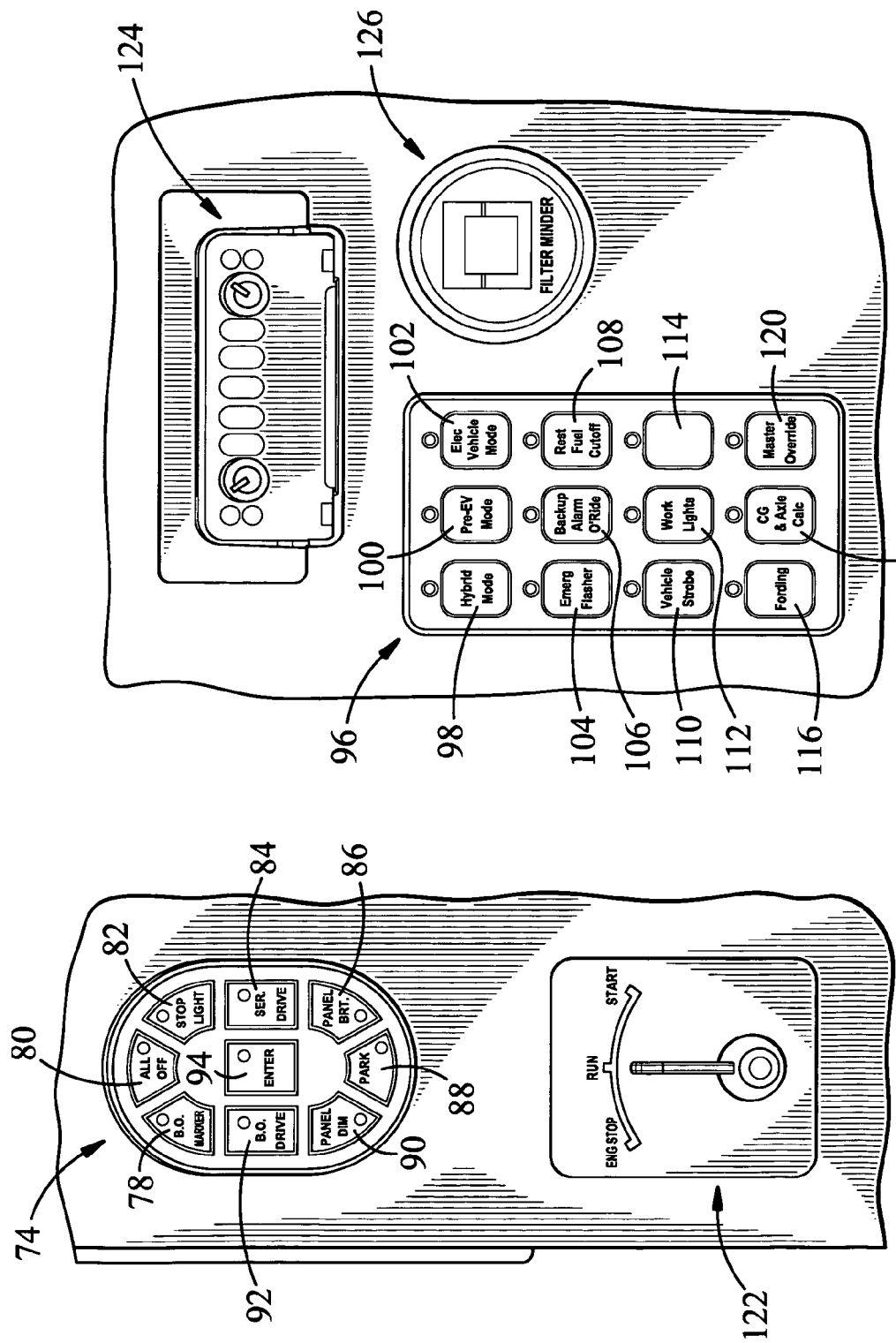
FIG. 5A is a diagrammatic view of the left side of the driver's front functions panel.
FIG. 5B is a diagrammatic view of the right side of the driver's front functions panel.
Figure 6:
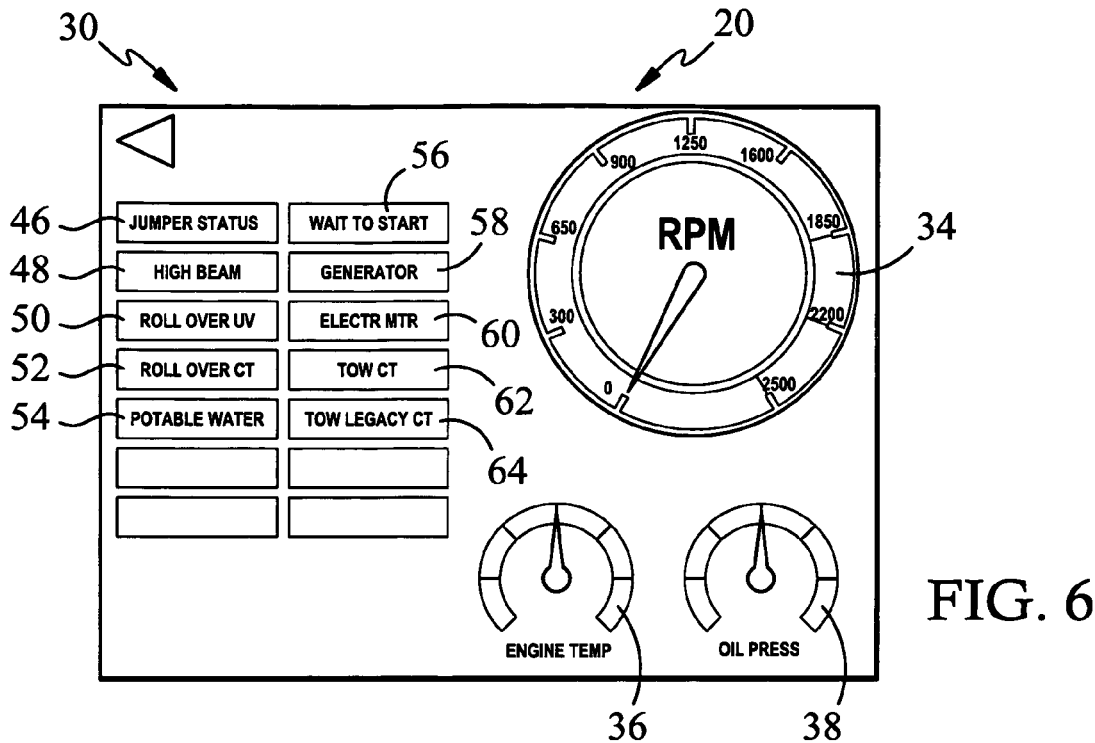
FIG. 6 is a diagrammatic view of the driver's left display panel.
Figure 7:
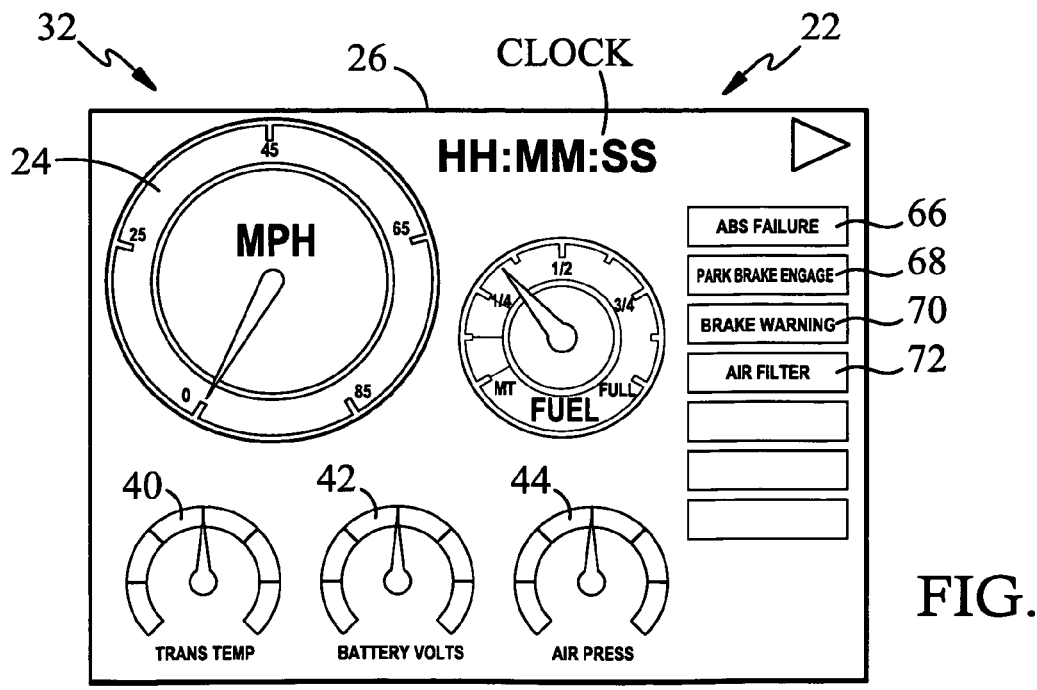
FIG. 7 is a diagrammatic view of the driver's right display panel.

Directly in front of the driver is the driver's front view panel 18 (see FIGS. 1-4) which includes two main driver displays 20 and 22 which provide the driver with basic information such as the vehicle speed display 24 and next to it is the fuel gauge 26. At the bottom of the primary displays 20 and 22 are a plurality of additional driver gauges 28 of various types. (See FIGS. 5-7) There is an RPM display 34 on the left display panel 20. Below the RPM display 34 there is an engine temperature gauge 36 and next to it is an oil pressure gauge 38. On the right display panel 22 and below the speed display 24 and fuel gauge 26, there are a transmission temperature gauge 40, a battery volts gauge 42 and an air pressure gauge 44

In addition to the gauges, the main driver displays 20 and 22 (see FIGS. 6-7) also have two banks of warning light including a first bank of warning lights 30 and a second bank of warning lights 32. The first bank of warning lights 30 include the following: jumper status 46, high beam 48, roll over UV 50, roll over CT 52, potable water 54, wait to start 56, generator 58, electric motor 60, tow CT 62 and tow legacy CT 64. The second bank of warning lights 32 include the following: ABS failure light 66, park brake engage light 68, brake warning light 70 and air filter light 72.

Examples of the utility of such lights are provided, for example, by the ABS failure light 66. The ABS built in test results are provided to the crew in that the ABS fault indicator light 66 is on the driver's side of the dashboard and it turns red during the test and under fault conditions and turns off when the test is complete with no errors found.

There is a master vehicle light switch MVLS 74 to the left of the driver's front view panel 18 below which is the keyless start switch 76. (See FIG. 5) The MVLS 74 has the following buttons/switches: B.O. marker 78, All Off 80, Stop Light 82, Ser. Drive 84, Panel Brt. 86, Park 88, Panel Dim 90, B.O. Drive 92 and Enter 94. All indicators and gauges are illuminated in service mode. The MVLS has a Panel Bright button 86 and a Panel Dim button 90. The vehicle driver has control using these control buttons as to the illumination level in any driving condition. This includes all dashboard components, i.e., MVLS 74 LEDs, Utility Keypad 96, Mobility Keypad, EATON PBSDC and the DIC. An appendix is attached showing some of the functions and conditions of the parts of the Utility Keypad and the Mobility Keypad.

There is a utility keypad 96 located to the right of the driver's right display panel 22 (see FIG. 5A). This utility keypad 96 has the following; Hybrid mode 98, Pre-EV mode 100, Electric vehicle mode 102, Emergency flashers 104, Backup alarm override 106, Reset fuel cutoff 108, vehicle strobe 110, work lights 112, spare 114, Fording 116, CG & axle calc 118 and master override 120.

Functionally related controls and displays include the start switch, the Master Vehicle Light Switch (MVLS), the mobility and utility keypads, the Collision Warning System (CWS) and the transmission controller. The start switch is the same as is used on the HMMWV and is ordered from left to right as ENG STOP, RUN, START. The MVLS is a new blackout lighting control switch that is standard for many vehicles in the tactical wheeled vehicle fleet, and has 9 keys ordered from left to right and top to bottom as B.O. MARKER, ALL OFF, STOP LIGHT, B.O. DRIVE, ENTER, SER. DRIVE, PANEL DIM, PARK, PANEL BRT. The Mobility Keypad pushbuttons are arranged in a matrix of 4 rows by 3 columns, and ordered from left to right and top to bottom as ON-ROAD, HARD PACK SNOW/ICE, (blank/spare), MODERATE OFF-ROAD, DEEP MUD, DEEP SAND, LOW RANGE, TOW-NEUTRAL, HIGH RANGE, MIN RIDE HEIGHT, MAX RIDE HEIGHT, EMERGENCY RESET. The Utility Keypad pushbuttons are arranged in a matrix of 4 rows by 3 columns, and ordered from left to right and top to bottom as HYBRID MODE, PRE-EV MODE, ELECTRIC VEHICLE MODE, PARK BRAKE, VEHICLE STROBE, BACKUP ALARM OVERRIDE, VEHICLE JUMP START, FORDING, CG & AXLE CALC., WORK LIGHTS, RESET FUEL CUTOFF, HILL DEFENSE. The CWS controls and displays consist of 2 units. The Driver Display Unit is located on the driver's front dashboard to indicate blockage in front of the vehicle, and a Side Sensor display is located on the driver's right side dashboard panel to indicate blockage on the right side of the vehicle. The vehicle transmission control panel is arranged vertically in 2 columns. The first column is ordered from top to bottom as APG, SERVICE, SHIFT UP, SHIFT DOWN. The second column is ordered from top to bottom as ePTO, R (reverse), N (neutral), D (drive), MANUAL.

The Start switch 122 is below the MVLS 74. The Collision Warning System (CWS) DDU 124 is above the utility keypad 96. There is an air filter display 126 adjacent the utility keypad 96. There are brake switches 128 under the utility keypad 96.

Figure 8:
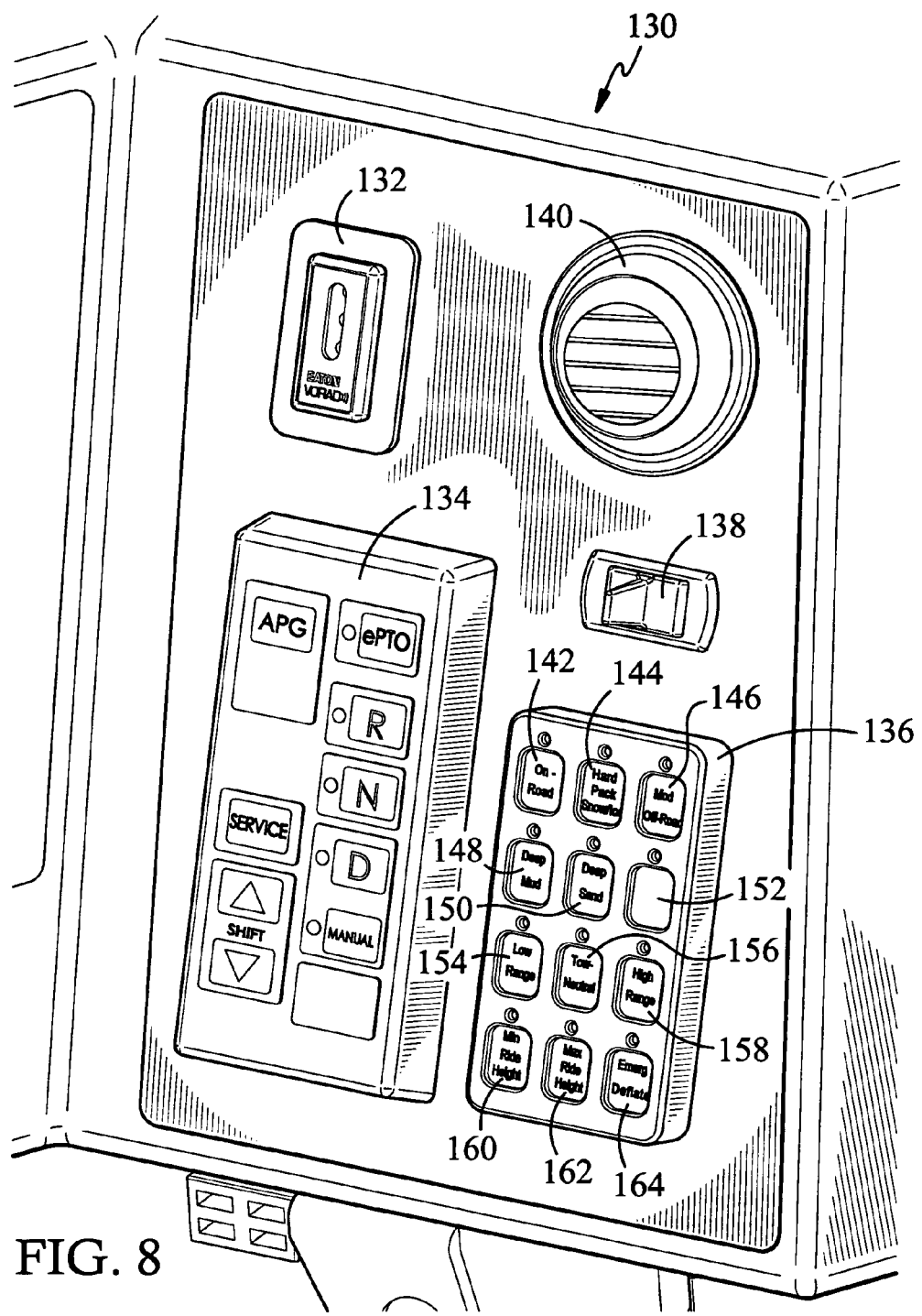
FIG. 8 is a diagrammatic view of the driver's side view panel.

There is a driver's side view panel 130 (see FIG. 8) which includes a collision warning system SSD 132, an EATON transmission controller 134, a mobility keypad 136 a lateral control 138 and an air vent 140. The mobility keypad includes: On-road 142, hard pack snow/ice 144, moderate off-road 146, deep mud 148, deep sand 150, spare 152, low range 154, tow-neutral 156, high range 158, Minimum ride height 160, maximum ride height 162 and emergency deflate 164.

Figure 9:
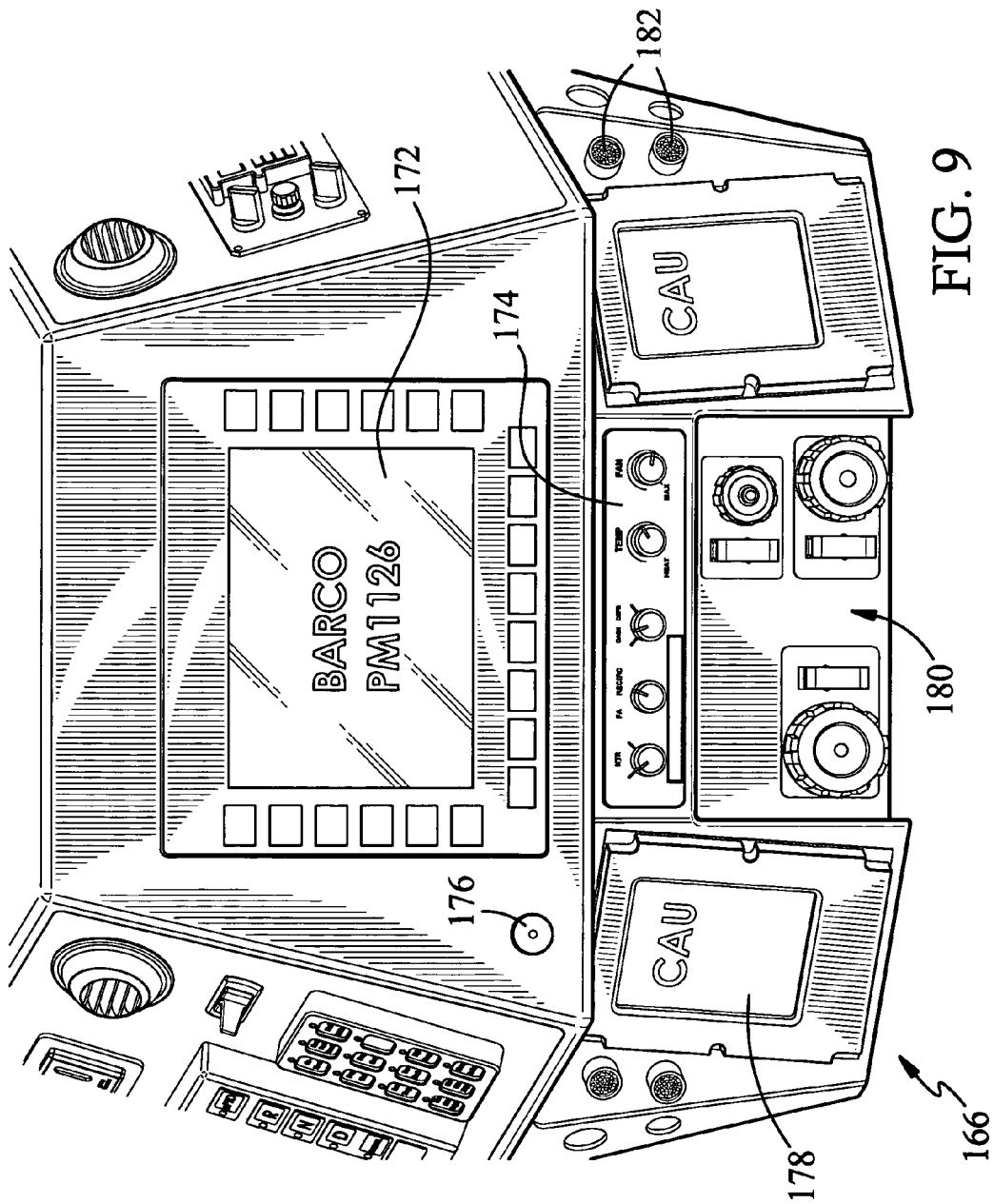
FIG. 9 is a diagrammatic view of the common area instrument cluster panel.

There is a common area instrument cluster panel 166 (see FIG. 9) which includes a vehicle management display 172, a cab climate control panel, a winch control receptacle, a vehicle intercom controller 178, a bank of convenience outlets for 12 and 24 VDC and 110 VAC, and a vehicle intercom controller receptacles bank 182.

Figure 10:
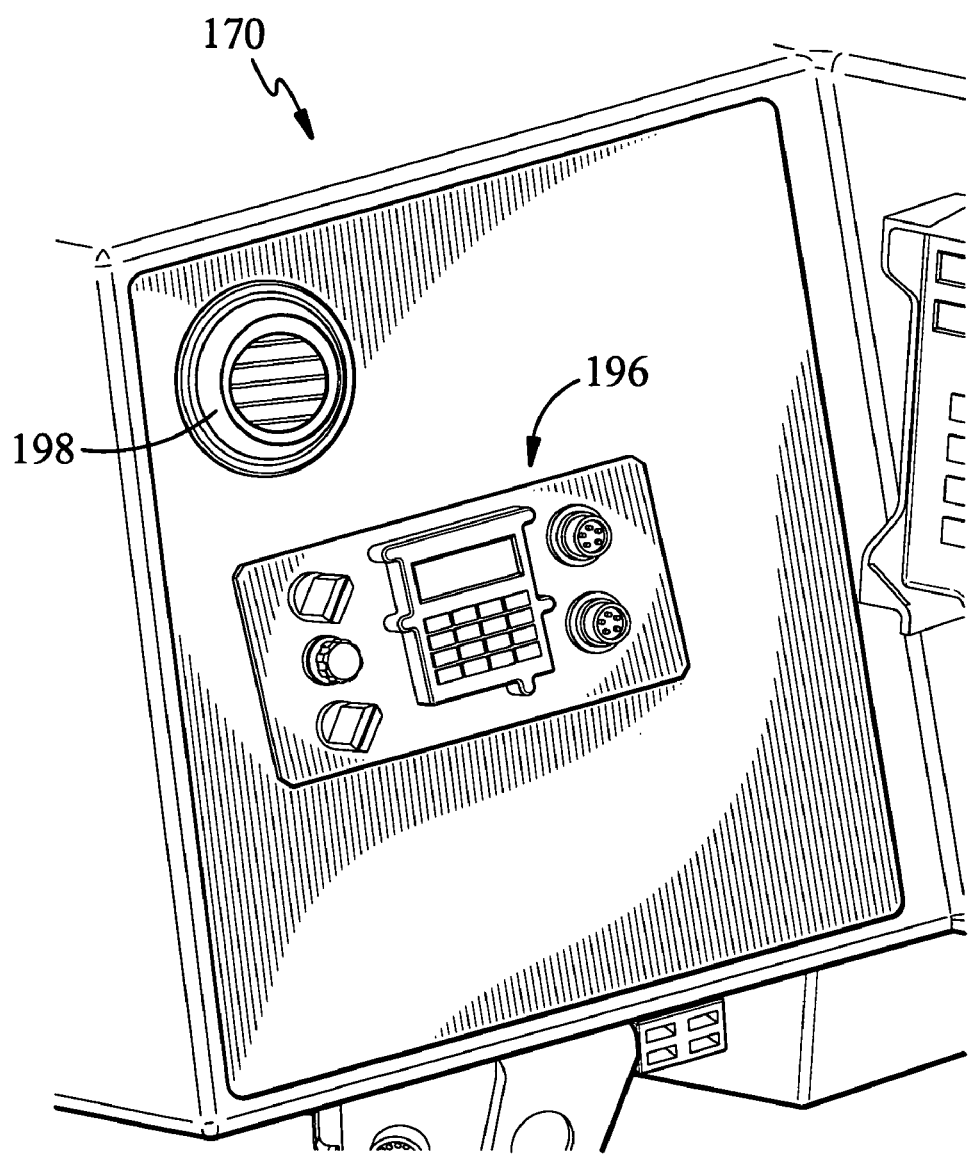
FIG. 10 is a diagrammatic view of the commander's side instrument panel.
Figure 12A:
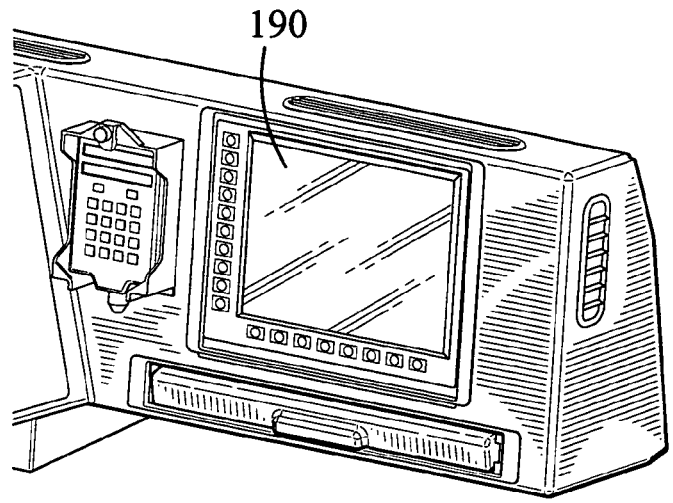
FIG. 12A is a diagrammatic view of the retractable map table with integrated keyboard in its retracted position.
Figure 12B:
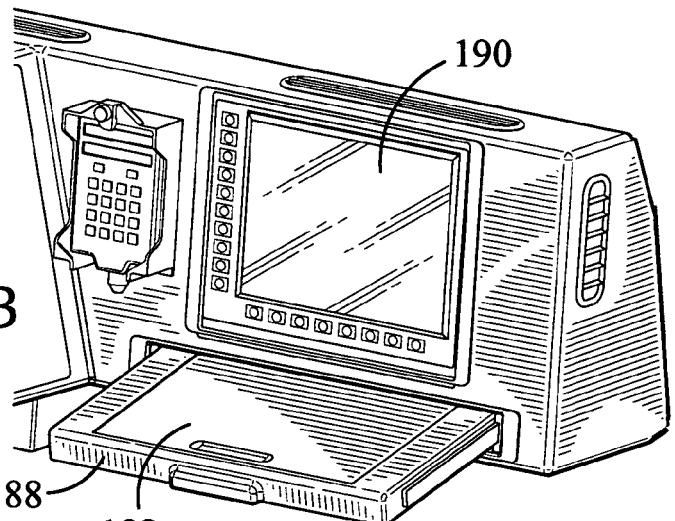
FIG. 12B is a view similar to FIG. 12A with the map table in its usable position.
Figure 12C:
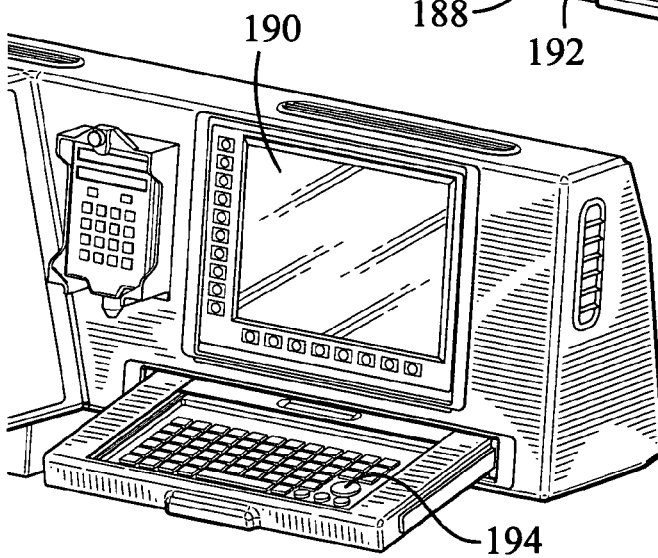
FIG. 12C is a view similar to FIG. 12B with the top shutter of the slide moved back to provide access to the keyboard.

There is a commander's front instrument panel 168 (see FIG. 11) and a commander's side instrument panel 170 (see FIG. 10). The commander's front instrument panel includes an EPLR (enhanced position location reporting system) URO (user remote option) 184, a retractable map table with integrated keyboard, a FBCB2 (Force XXI Battle Command Brigade and Below which provides situational awareness and command and control to the lowest tactical echelons. It facilitates a seamless flow of battle command information across the battlespace, and interoperates with external command and control and sensor systems, such as ATCCS. The end result is a vertical and horizontal integration of the digital battlespace and the brigade-and-below tactical unit levels) display panel for commander information 190 and an air vent 186. FIGS. 12A, 12B and 12C show the integrated map table 188 in various positions. The integrated map table/keyboard assembly 188 is mounted so it can slide in and out to provide a shutter panel 192 which can be used as a map/writing table. When the table is slid out in addition to being used as a writing table, the shutter panel 192 can be slid while the table remains out, and there is a keyboard 194 which is located inside the table and which is then accessible.

The commander's side instrument panel 170 includes a remote SINCGARS radio interface 196 and an air vent 198. (SINCGARS is a single channel ground and airborne radio system which is a recent family of VHF-FM combat net radios which provide the primary means of command and control for infantry, armor and artillery units. They are used with VRCUs (vehicle remote control unit) which permit remote control of single or dual SINCGARS radios in vehicular applications. Using this reduces vehicle cabin space and weight claims issues in support of the SINCGARS radio installation.

SINCGARS is a new family of VHF-FM combat net radios which provides the primary means of command and control for Infantry, Armor and Artillery Units. SINCGARS is designed on a modular basis to achieve maximum commonality among the various ground and airborne system configurations.

There are a plurality of fresh air vents such as vents 140 in the driver's side panel and 198 in the commander's side panel. In addition there are a plurality of defrost vents 200 along the top and side of the dashboard as shown, for example, in FIGS. 1 and 3.

It is to be understood that the above-described embodiments are simply illustrative of the principles of the invention. Various and other modifications and changes may be made by those skilled in the art which will embody the principles of the invention and fall within the spirit and scope thereof.

| | Modes | Hybrid Mode | Diesel Only Mode (auto) | Pre-EV Mode | EV Mode | Low Range | Tow Neutral | High Range | C130 Load Min Height 7 in. | On-Road Height 11 in. Auto Mode | Off-Road Height 15 in. Auto Mode | Max Height 21 in. | Load Leveling |
|---|---|---|---|---|---|---|---|---|---|---|---|---|---|
| Utility 1 | Hybrid Mode | X | | | | X | X | X | Independent | Independent | Independent | Independent | Independent |
| Utility 2 | Pre-EV Mode | | | X | | X | X | X | Independent | Independent | Independent | Independent | Independent |
| Utility 3 | EV Mode | | | | X | X | X | X | N/A | N/A | N/A | N/A | N/A |
| Mobility 1 | On Road/ Snow Like | X | | X | X | X | X | X Default | X | X Auto selected | X | X Manual | X 2nd execute |
| Mobility 2 | Off Road | X | | | X | X | | X Default | X Diff Locked | N/A | X Auto selected | X Manual | X 2nd execute |
| Mobility 3 | Deep Mud/ Deep Sand | X | | X | X | X | | X Default | X Diff Locked | N/A | X Auto selected | X Manual | X 2nd execute |
| Mobility 4 | Fording (No fans, no CG) | | X auto select | X | | X | | X Default | N/A | N/A | N/A | X Auto selected | N/A |

| | Modes | Emergency Flashers | Backup Alarm Override | Reset Fuel Cutoff | Vehicle Strobe | Work Lights | UV CG/ Axle Calc | UV + CT CG/ Axle Calc | Master Override | CTIS Tire Deflate Auto Mode | Time Deflate | Center Diff |
|---|---|---|---|---|---|---|---|---|---|---|---|---|
| Utility 1 | Hybrid Mode | X | X | X | X | X | X | X | X | X | X | |
| Utility 2 | Pre-EV Mode | X | X | X | X | X | X | X | X | X | X | |
| Utility 3 | EV Mode | X | X | X util mode | X | X | X | X | X | X | X | |
| Mobility 1 | On Road/ Snow/ice | X | X | X util mode | X | X | X | X | X | Highway | X | Open |
| Mobility 2 | Off Road | X | X | X util mode | X | X | N/A | N/A | X | Cross Country | X | Locked |
| Mobility 3 | Deep Mud/ Deep Sand | X | X | X util mode | X | N/A | N/A | N/A | X | Mud/Sand | X | Locked |
| Mobility 4 | Fording | X | X | X util mode | X | X | N/A | N/A | X | Mud/Sand | N/A | Locked |

Solid Light (On)   Operation Selected/Active
Stow Blink   Out of Range
Fast Blink   Error
No Light (Out)   No Selection/inactive

The invention claimed is:

1. A dashboard for a tactical vehicle having a driver position and a command position, comprising:
   a. a plurality of displays and warning lights viewable from the driver position to provide information for the driver of a vehicle;
   b. a plurality of displays and communications devices viewable from the command position to provide information for the commander sitting in the passenger seat of such vehicle;
   c. a vehicle management display, climate control panel and vehicle intercom devices accessible for use from the driver position and from the command position of the vehicle; and
   wherein there is also a gunner position and the vehicle management display, climate control panel and vehicle intercom devices are also accessible for use for the gunner position.

2. A dashboard as defined in claim 1 wherein the displays and warning lights viewable from the driver position include a driver front view panel and a driver side view panel, said driver front view panel having two main driver displays including vehicle speed display, fuel gauge, rpm display, engine temperature, oil pressure, transmission temperature, battery, air pressure, and the driver front view panel includes a master vehicle light switch, a utility keypad, the driver front view panel further includes two banks of warning lights, a collision warning system, and a start switch, and the driver side view panel includes a collision warning system SSD, an EATON transmission controller, a lateral control, and a mobility keypad.

3. A dashboard as defined in claim 2 wherein the displays and communications devices viewable from the command position include a commander front panel and a commander side panel, said commander front panel including a retractable map table with integrated keyboard, an enhanced position location reporting system, and an FBCB2, and said commander side panel includes a remote SINCGARS radio interface.

4. A dashboard as defined in claim 3 wherein the displays and warning lights viewable from the driver position include a driver front view panel and a driver side view panel, the displays and communications devices viewable from the command position include a commander front panel and a commander side panel said vehicle management display, climate control panel and vehicle intercom devices are located between the driver side panel and the command side panel and further includes winch controls, a vehicle intercom controller and receptacles and convenience outlets.

5. A dashboard for a tactical vehicle having a driver position and a command position, comprising:
   a. a plurality of displays and warning lights viewable from the driver position to provide information for the driver of a vehicle;
   b. a plurality of displays and communications devices viewable from the command position to provide information for the commander sitting in the passenger seat of such vehicle;
   c. a vehicle management display, climate control panel and vehicle intercom devices accessible for use from the driver position and from the command position of the vehicle; and
   wherein the displays and warning lights viewable from the driver position include a driver front view panel and a driver side view panel, said driver front view panel having two main driver displays including vehicle speed display, fuel gauge, rpm display, engine temperature, oil pressure, transmission temperature, battery, air pressure, and the driver front view panel includes a master vehicle light switch, a utility keypad.

6. A dashboard as defined in claim 5 wherein the driver front view panel further includes two banks of warning lights, a collision warning system, and a start switch.

7. A dashboard as defined in claim 6 wherein the driver side view panel includes a collision warning system SSD, an EATON transmission controller, a lateral control, and a mobility keypad.

8. In a vehicle as defined in claim 6, wherein there is a gunner position and the video matrixed display is viewable from the gunner position.

9. In a vehicle as defined in claim 5 wherein at least one of the displays is constructed and arranged to be video matrixed so that the information is viewable from both the driver position and the command position.

10. A dashboard for a tactical vehicle having a driver position and a command position, comprising:
    a. a plurality of displays and warning lights viewable from the driver position to provide information for the driver of a vehicle;
    b. a plurality of displays and communications devices viewable from the command position to provide information for the commander sitting in the passenger seat of such vehicle;
    c. a vehicle management display, climate control panel and vehicle intercom devices accessible for use from the driver position and from the command position of the vehicle; and
    wherein the displays and communications devices viewable from the command position include a commander front panel and a commander side panel, said commander front panel including a retractable map table with integrated keyboard, an enhanced position location reporting system, and an FBCB2, and said commander side panel includes a remote SINCGARS radio interface.

11. A dashboard for a tactical vehicle having a driver position and a command position, comprising:
    a. a plurality of displays and warning lights viewable from the driver position to provide information for the driver of a vehicle;
    b. a plurality of displays and communications devices viewable from the command position to provide information for the commander sitting in the passenger seat of such vehicle;
    c. a vehicle management display, climate control panel and vehicle intercom devices accessible for use from the driver position and from the command position of the vehicle; and
    wherein the displays and warning lights viewable from the driver position include a driver front view panel and a driver side view panel, the displays and communications devices viewable from the command position include a commander front panel and a commander side panel said vehicle management display, climate control panel and vehicle intercom devices are located between the driver side panel and the command side panel and further includes winch controls, a vehicle intercom controller and receptacles and convenience outlets.

* * * * *